US007826069B2

(12) United States Patent
Rueb et al.

(10) Patent No.: US 7,826,069 B2
(45) Date of Patent: Nov. 2, 2010

(54) LASER PROJECTION SYSTEMS AND METHODS

(75) Inventors: Kurt D. Rueb, Kitchener (CA); V. Robert Jackson, West Elora (CA); Jarrad V. Morden, Waterloo (CA)

(73) Assignee: Metris Canada, Inc., Waterloo (CA)

( * ) Notice: Subject to any disclaimer, the term of this patent is extended or adjusted under 35 U.S.C. 154(b) by 0 days.

(21) Appl. No.: 12/478,856

(22) Filed: Jun. 5, 2009

(65) Prior Publication Data

US 2009/0257069 A1  Oct. 15, 2009

Related U.S. Application Data

(62) Division of application No. 10/913,842, filed on Aug. 6, 2004, now Pat. No. 7,545,517.

(60) Provisional application No. 60/501,885, filed on Sep. 10, 2003.

(51) Int. Cl.
*G01B 11/14* (2006.01)
(52) U.S. Cl. ..................... 356/614; 250/206.1
(58) Field of Classification Search ........ 356/614; 250/206.1
See application file for complete search history.

(56) References Cited

U.S. PATENT DOCUMENTS

| 4,294,544 | A |   | 10/1981 | Altschuler et al. |
|---|---|---|---|---|
| 5,117,221 | A | * | 5/1992 | Mishica, Jr. ............ 340/556 |
| 5,148,591 | A |   | 9/1992 | Pryor |
| 5,646,859 | A |   | 7/1997 | Petta et al. |
| 5,671,053 | A |   | 9/1997 | Wigg et al. |

(Continued)

FOREIGN PATENT DOCUMENTS

CA            2235173         10/1998

(Continued)

OTHER PUBLICATIONS

RapidformXO Overview 3D Scanning Applications www.rapidform.com Oct. 11, 2004.

(Continued)

*Primary Examiner*—Tarifur R. Chowdhury
*Assistant Examiner*—Isiaka O Akanbi
(74) *Attorney, Agent, or Firm*—Howard & Howard Attorneys PLLC

(57) ABSTRACT

A laser imaging system and method of projecting a laser template on a surface, including independently determining a position and orientation of the surface using an external metrology device, independently determining a position and orientation of a laser projector using the metrology device, generating a signal from the metrology device to a computer and orienting the laser projector relative to the surface to project a laser template. The apparatus includes a plurality of metrology transmitters at fixed locations, a plurality of metrology receivers at fixed locations relative to the surface and a plurality of metrology receivers at fixed locations relative to either the laser projector or laser targets within a field of view of the laser projector. A laser projector and frame assembly is also disclosed, wherein the metrology receivers are located on the frame and the frame includes laser targets for correcting laser drift. Kinematic supports for the metrology receivers are disclosed as well as an independent laser tracker.

38 Claims, 11 Drawing Sheets

U.S. PATENT DOCUMENTS

| | | | |
|---|---|---|---|
| 5,742,385 A | 4/1998 | Champa | |
| 5,757,500 A | 5/1998 | Rueb | |
| 6,480,271 B1 | 11/2002 | Cloud et al. | |
| 6,501,543 B2 | 12/2002 | Hedges et al. | |
| 6,535,282 B2 | 3/2003 | Hedges et al. | |
| 6,985,240 B2 * | 1/2006 | Benke et al. | 356/614 |
| 2003/0086603 A1 | 5/2003 | Davidson et al. | |
| 2004/0189944 A1 * | 9/2004 | Kaufman et al. | 352/10 |

FOREIGN PATENT DOCUMENTS

| | | |
|---|---|---|
| EP | 1288754 | 5/2003 |
| WO | 0182634 | 11/2001 |
| WO | 03002935 | 1/2003 |
| WO | 2005025199 | 3/2005 |
| WO | 2006078684 | 7/2006 |

OTHER PUBLICATIONS

Accurex Company High-Accuracy 3-Dimensional Measurement Systems and Services www.accurexmeasure.com Oct. 19, 2004.

Raindrop Geomagic Products Computer Aided Inspection Software www.geomatic.com Oct. 11, 2004.

Maya Metrix 3D CAD-to-Part Inspection Using Imageware Inspect; Geometric Verification and Dimensional Analysis www.mayametrix.com Oct. 11, 2004.

Constellation 3D-I 071502 Indoor GPS Technology for Metrology ARCSecond, Copyright 2002 ARC Second, Inc.

Supplemental European Search Report regarding European patent application No. 04769721.4-2213 PCT/IB2004003495 (publication No. 1682936) dated May 12, 2006.

International Search Report PCT/IB2004003495 mailed May 13, 2005.

International Search Report regarding International Application No. PCT/US 06/01680 mailed Sep. 21, 2007.

\* cited by examiner

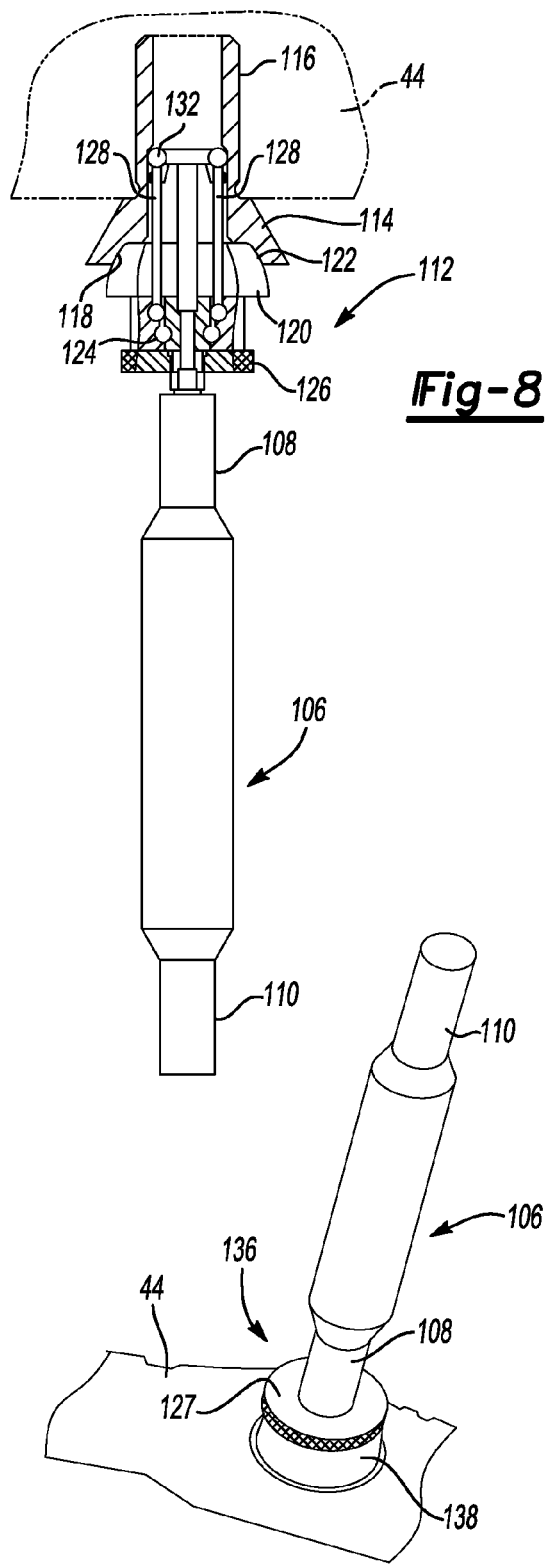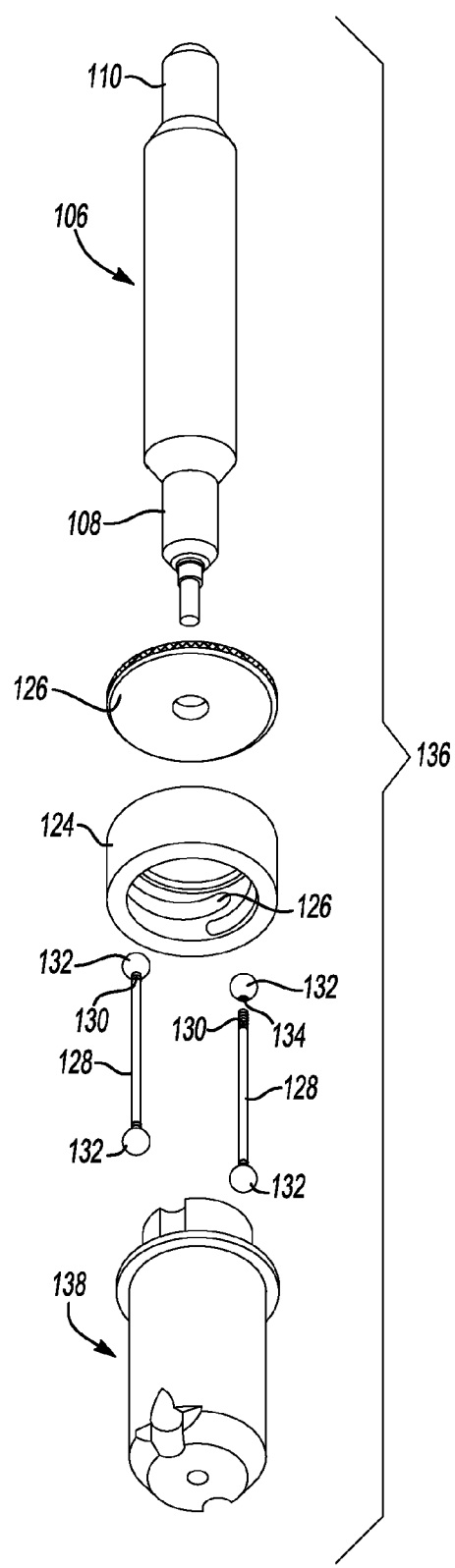
Fig-8
Fig-9
Fig-10

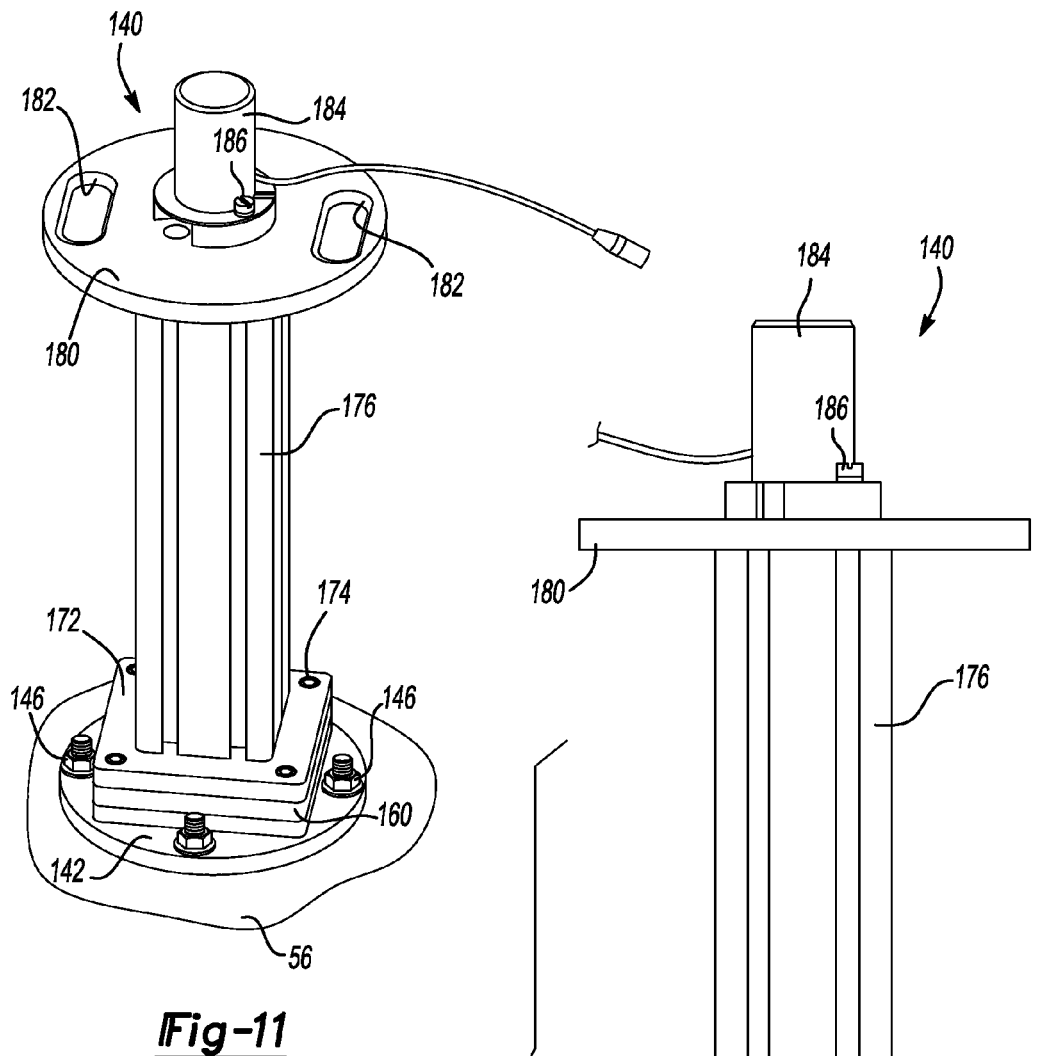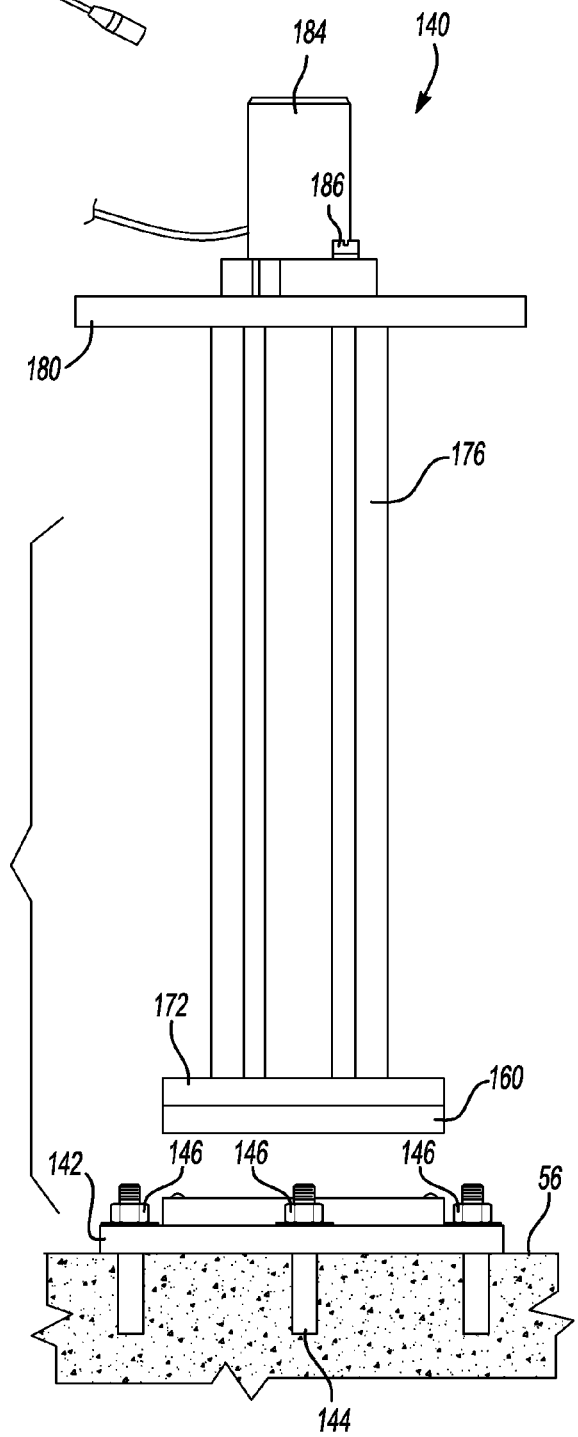
*Fig-11*
*Fig-12*

LASER PROJECTION SYSTEMS AND METHODS

RELATED APPLICATIONS

This application claims priority to U.S. Nonprovisional patent application Ser. No. 10/913,842, filed Aug. 6, 2004, which claims priority to U.S. Provisional Patent Application, Ser. No. 60/501,885, filed Sep. 10, 2003.

FIELD OF THE INVENTION

This invention relates to a method and apparatus for projecting a laser template on a surface particularly including a method and apparatus for projecting a laser template on a surface without laser targets on the surface, or a "targetless" laser projection system and method which increases the application of laser projection systems, including projection of laser templates on larger surfaces, such as aircraft, or where laser targets on the surface would interfere with further operations or conventional laser projection systems would be impractical or impossible.

BACKGROUND OF THE INVENTION

Visible laser projection systems are now widely used in industry to project a laser outline or "template" on a work or target surface for assembling large two or three-dimensional structures or assemblies, such as prefabricated roof trusses or aerospace composite components. By precisely characterizing the laser projector and establishing the exact relative position of the laser projector to the assembled structure or composite, the laser projection system is capable of accurately producing a laser image or template at known coordinates on a work or target surface which may be planar or curvilinear.

For example, U.S. Pat. No. 5,646,859 assigned in part to the assignee of this application, discloses a method and apparatus for defining a laser template for assembling a structure, such as a prefabricated roof truss. The method and apparatus disclosed in this patent includes a laser projector or a plurality of laser projectors mounted above the work surface, a plurality of laser sensors or laser targets fixed at predetermined locations on or adjacent the work surface, a computer and a sensor on the laser projector. The laser projector periodically or continuously scans the laser targets and the reflected light from the laser targets to the sensor of the laser projector determines the precise projection angle associated with the center of each target datum. Using a series of mathematical algorithms, the precise position and orientation of the laser projector relative to the work surface or part is then calculated by the computer. This spatial information, in conjunction with a known display list, allows the laser projector to generate accurate laser templates or laser outlines of the part on the target surface. The laser projector may be fixed relative to the part or work surface or for larger assemblies, a plurality of laser projectors may be used or the laser projectors may be moved relative to the work surface as disclosed in the above-referenced patent. The laser targets or position sensors may include a photo transistor, but in most applications, retroreflective laser targets are now used.

Alignment and calibration methods similar to the above provide the accuracy needed for a wide range of laser projection applications. A typical accuracy specification is ±0.015 inches at a 10 to 15 fool stand off distance when measured perpendicular to the laser beam. This approach allows good flexibility in positioning of the laser projectors because the mounting location can be arbitrarily selected so long as a sufficient number of known laser target locations are detectable within the field of view of the laser projector which, as set forth above, must be located at predetermined locations on or adjacent the target surface. In a typical application, a minimum of four laser targets must be located by the sensor system (laser target and sensor) to establish the position of the laser projector relative to the assembled structure or part and the work or target surface.

However, as set forth above, the requirement for laser targets at fixed locations on or adjacent the target surface has limited the applications for laser projection systems. For example, to guide the placement of carbon fiber composite materials for aerospace structures, it is generally necessary to locate the targets on the target surface which will eventually be covered by the composite material. Further, if the structure or target surface is very large, the required laser projection area may be too large to allow placement of laser or reference targets within the field of view of the laser projectors, making accurate projection difficult. Another problem addressed by the laser projection system of this invention is laser projection or image drift, which may result from variations in temperature and humidity. Further, the use of reference laser targets is cumbersome, initially requiring mounting of appropriate laser target locations on the target or tool together with accurate measurement of each target coordinate, typically using a theodelite laser tracker or other coordinate measuring machine (CMM). As used herein, CMM covers any coordinate measuring system. Further, when a laser projector is positioned or moved, the laser projector must be trained usually by manual operator guidance, to locale and identify the appropriate laser or reference targets and the placement of the laser projector must also be carefully controlled to ensure that the located laser targets provide an adequate position reference.

A disclosed embodiment of the laser projector system and method of this invention utilizes an indoor global positioning system (GPS), such as disclosed in U.S. Pat. Nos. 6,501,543 and 6,535,282 of Arc Second, Inc., the disclosures of which are incorporated herein by reference. Indoor GPS systems are also commercially available from Arc Second, Inc. However, the laser projection systems and methods of this invention are not limited to indoor GPS systems and other external metrology devices may be utilized, including laser theodelite transmitter tracking devices, optical photogrametry devices, camera base systems, infrared transmitter metrology devices and other metrology tracker projection devices. For example, Leica Geosystems and Northern Digital offer laser trackers systems for three-dimensional measurements, wherein the laser from the metrology transmitters is reflected by mirrors or a corner cube reflector (CCR) on a parallel path to a sensor on the metrology transmitters and the data from the receiver is transmitted to a computer to determine the location of the reflector. Such external metrology devices generally include a metrology transmitter, typically a light metrology transmitter, and a plurality of metrology receivers or reflectors which are fixed at predetermined locations.

SUMMARY OF THE INVENTION

The method of projecting a laser shape or outline, referred to hereinafter as a "laser template," on a surface or tool, hereinafter referred to as the "target surface," of this invention includes the following steps. First, the method of this invention includes independently determining a position and orientation of the target surface using an external metrology device, such as described above, and independently determining a position and orientation of a laser projector using the external metrology device. As set forth above, the external metrology device generally includes a plurality of metrology transmitters at fixed locations, typically light metrology transmitters, such as infrared laser light metrology transmitters, and a plurality of metrology receivers also at fixed locations. As used herein, the term "metrology receivers" includes both active receivers, such as the indoor GPS receivers, and passive devices, such as mirrors or coiner cube reflectors, which reflect light back to sensors on the metrology transmitters and thus both embodiments have a sensor associated with the receiver. In determining the position and orientation of the target surface using an external metrology device, a first plurality of metrology receivers are fixed relative to the target surface. In determining the position and orientation of a laser projector or projectors using the external metrology device, a second plurality of metrology receivers are fixed relative to the laser projector or projectors. As used herein, the term "fixed" means that the location is stable as required for determination of the location of the transmitters, receivers, laser targets, etc.

The method of this invention then includes generating a signal from the external metrology device to a computer and the computer then uses the data received from the metrology device to determine the position and orientation of the laser projector relative to the target surface. The metrology receivers may be connected to the computer or the data from the metrology receivers may be transmitted to the computer by a wireless system. The method of this invention then includes orienting a laser from the laser projector or projectors relative to the target surface to a project laser template on the target surface at a predetermined or defined location and orientation using the data from the computer and finally projecting the laser template on the target surface at the predetermined location and orientation with the laser projector. The method of projecting a laser template on a target surface of this invention thus eliminates the requirement for laser targets on or adjacent the target surface and calibration of the laser projector relative to laser targets on or adjacent the target surface and is thus "targetless." Further, the metrology receivers do not have to be within a field of view of the laser projector or projectors.

A preferred embodiment of the method of projecting a laser template on a target surface of this invention may also be utilized to correct for laser projection or image drift or movement of the laser projector without the requirement for laser targets fixed at predetermined locations on or adjacent the target surface and calibration of the laser projector relative to such laser targets as described above. A disclosed embodiment of the method of correcting for laser drift or movement of the laser projector of this invention includes periodically or continuously projecting a laser from the laser projector on laser targets within a field of view of the laser projector. That is, rather than scanning laser targets fixed at predetermined locations relative to the target surface, the method of correcting for laser drift of this invention includes fixing laser targets relative to the projector, rather than the target surface. Alternatively, the laser targets may be fixed relative to the metrology receivers within a field of view of the laser projector, permitting location of the laser projector by scanning the laser targets. As described below, in one preferred embodiment of the laser projection system of this invention, the laser projector is supported in a frame assembly having laser targets on the frame assembly opposite the laser projector and the laser projector then periodically or continuously scans the laser target to correct for laser drift or movement of the laser projector. Where the laser targets are retroreflective targets, as described above, the method of this invention includes reflecting the laser beam from the laser targets to a sensor on the laser projector and generating a signal to a computer connected to a control which corrects for laser image drift or movement of the laser projector.

In one preferred embodiment of the frame assembly of this invention disclosed herein, the frame includes a support surface and a distal open end. The laser projector is rigidly supported on the support surface of the frame assembly and the method of this invention then includes projecting the laser template through the distal open end of the frame assembly. The metrology receivers in the disclosed embodiment of the frame assembly are attached at predetermined locations to the distal open end of the frame assembly for accurately determining the position and orientation of the laser targets and thus the laser projector by the method of this invention. Further, in the disclosed embodiment of the frame assembly, the laser targets are also located on the distal open end of the frame assembly opposite the laser projector. The method of this invention then includes periodically scanning the laser targets on the distal open end of the frame assembly and correcting for laser image drift or movement of the laser projector. However, where the metrology receivers are fixed relative to the laser targets, the laser projector may move relative to the frame and determine its position and orientation by scanning the laser targets. As used herein, the term "periodically" includes continuously scanning the laser targets and the laser targets may be retroreflective targets or any suitable laser target or position sensor, as disclosed for example in the above referenced U.S. Pat. No. 5,646,859.

The "targetless" laser imaging system of this invention thus includes a plurality of metrology transmitters located at fixed locations, a laser projector or a plurality of laser projectors, a first plurality of metrology receivers or target reflectors and receivers on the metrology transmitters, as described above, at fixed locations relative to the target surface and second plurality of metrology receivers or target reflectors located at fixed locations relative to the laser projector. The laser imaging system further includes a computer receiving data from the metrology receivers or sensors determining the precise location and orientation of the laser projector relative to the target surface and controlling the laser projector to project a laser template on the target surface at the predetermined or defined location and orientation. As described above, the laser imaging system of this invention may further include a plurality of laser targets at fixed locations relative to the laser projector within a field of view of the laser projector or the laser projector may be movable provided the laser targets are fixed relative to the metrology receivers and the computer then controls the laser projector to periodically scan the laser targets and compensate for laser image drift or movement of the laser projector.

As described above, in the disclosed embodiment of the laser imaging system of this invention, the laser projector may be rigidly supported on a support surface of a frame assembly having an open distal end, wherein a plurality of metrology receivers or target reflectors are fixed to the open distal end of the frame at predetermined locations, permitting an independent determination of the position and orientation of the laser projector or projectors. Where the frame assembly also includes laser targets opposite the laser projector, as described above, the laser targets must be spaced from the laser projector and the disclosed embodiment of the frame assembly includes strut portions interconnecting the support surface and the open distal end of the frame assembly. In one preferred embodiment of the laser projector and sensor assembly of this invention, the frame assembly is integrally formed from a material having a low co-efficient of expansion and contraction to avoid errors due to thermal expansion or contraction, such as a carbon fiber composite. Because the location and orientation of the metrology receivers or reflectors is fixed relative to the metrology receivers or the laser projector or projectors of this invention, the laser projector or projectors may be moved relative to the target surface as required by the application. In the disclosed embodiments, the laser projector and frame assembly is supported on a universal joint, permitting movement of the laser projector in at least two axes. As disclosed herein, the laser projectors may also be supported on carts or dollies for ease of placement of the laser projectors relative to the target surface. Further, because the first plurality of metrology receivers or reflectors are fixed at predetermined known locations relative to the target surface, the target surface may also be moved to relative to the laser projectors.

As set forth above, the laser projection system and method of this invention is particularly, but not exclusively suitable for projecting a laser template on a target surface, where laser targets would interfere with subsequent operations, such as ply layup on large target surfaces, such as an aircraft body, for subsequent operations, such as the application of decals, placement of fixtures and covering the joints between the components of the target surface, such as an aircraft. Of course, however, the laser projection system and method of this invention is not limited to any particular application. In such applications, however, it is desirable to fix the metrology receivers or reflectors on stanchions, such that the reflector or receiver is located above the floor for ease of reference in determining the position and orientation of the target surface. In one preferred embodiment of the metrology receiver assembly of this invention, the receiver assembly may be removed from the support and replaced without changing the position and orientation of the metrology receiver. In this embodiment, the metrology receiver assembly includes a support stanchion adapted to be permanently affixed to a support in a workstation in a predetermined location. A bottom kinematic plate is fixed to the top of the support stanchion and the assembly includes a receiver support member having a top kinematic plate secured to the support member releasably attached to the bottom kinematic plate. In a preferred embodiment of the receiver assembly, one of the top and bottom kinematic plates includes a plurality of spaced projecting portions and the other of the lop and bottom kinematic plates has a plurality of spaced recesses configured to receive the spaced projecting portions to align and orient the top kinematic plate relative to the bottom kinematic plate, such that the top kinematic plate, receiver support and metrology receiver or reflector may be removed from and replaced on the support stanchion without changing the position and orientation of the metrology receiver. In the disclosed embodiment of the metrology receiver assembly of this invention, the top kinematic plate is releasably attached to the bottom kinematic plate by a magnet, such that the top kinematic plate, receiver support and metrology receiver may be easily removed from and replaced on the support stanchion without changing the position and orientation of the assembly.

It is also desirable to independently determine the position and orientation of the metrology receivers or reflectors in many applications. The laser projection system of this invention includes metrology receivers having a support adapted to be fixed at a predetermined location and orientation, as described above. In one disclosed embodiment of the metrology receiver assembly, the support includes a cup-shaped enclosure mounted on the support, a first metrology receiver adapted to receive or reflect a signal from a metrology transmitter, as described above, and a second receiver to reflect a laser, such as a spherical mounted reflector (SMR) or a corner cube reflector (CCR) or a photogrametric or retroreflective laser target, wherein the cup-shaped enclosure is configured to receive and orient one of the first metrology receivers or the CMM laser reflector receiver, such that the position and orientation of the metrology receiver may be independently determined and confirmed for accuracy as required by certain applications.

It is also possible using the laser projection system and method of this invention to project a laser template on a target surface which is located outside the field of view of the laser projector. In one disclosed embodiment of the laser projection system of this invention, the laser template is projected on a mirrored surface to project the laser template on a target surface located outside the field of view of the laser projector. In one preferred embodiment, the mirror is supported by a frame assembly having laser targets as described above. Where the laser projector and mirror assembly is utilized in a targetless laser projection system, the mirror frame may also include metrology receivers or reflectors, as described above. Finally, the laser projector of the laser projector system of this invention may be mounted on other conveyances, such as a lift depending upon the application. In one disclosed embodiment, the laser projector and frame assembly is mounted on a platform which may also be used by personnel for subsequent operations and the platform is mounted on a piston telescopically received in a vertical hydraulic or pneumatic cylinder attached to the roof or ceiling of a workstation, permitting the platform to be moved vertically for applications requiring vertical movement.

As will be understood by those skilled in this art, various modifications may be made to the laser projection systems and methods of this invention within the purview of the appended claims. For example, the laser projection system and method of this invention may be utilized with any metrology device, including but not limited to indoor GPS metrology and laser tracking devices as described above. The computer used in the method of this invention and the laser projection or imaging systems may also be a plurality of computers. The examples of the method and apparatus disclosed in the following description of the preferred embodiments of this invention and the appended drawings are for illustrative purposes only and do not limit the inventions disclosed herein except as specifically set forth in the following claims.

BRIEF DESCRIPTION OF THE DRAWINGS

FIG. 8 is a side partially cross-sectioned side view of one embodiment of a vector bar metrology sensor or receiver and removable rigid connector and support assembly suitable for attachment of the metrology receiver to an aircraft;

FIG. 9 is an exploded view of an alternative embodiment of a vector bar metrology receiver and removable rigid connector and support assembly;

FIG. 10 is a side perspective view of the assembly shown in FIG. 9 following assembly to the target surface, such as an aircraft;

FIG. 11 is a side perspective view of a kinematic metrology sensor support assembly suitable for attachment to a floor of the workstation;

FIG. 12 is a side view of the kinematic metrology receiver and support assembly shown in FIG. 11 with the sensor and support removed;

DESCRIPTION OF THE PREFERRED EMBODIMENTS

Figure 1:
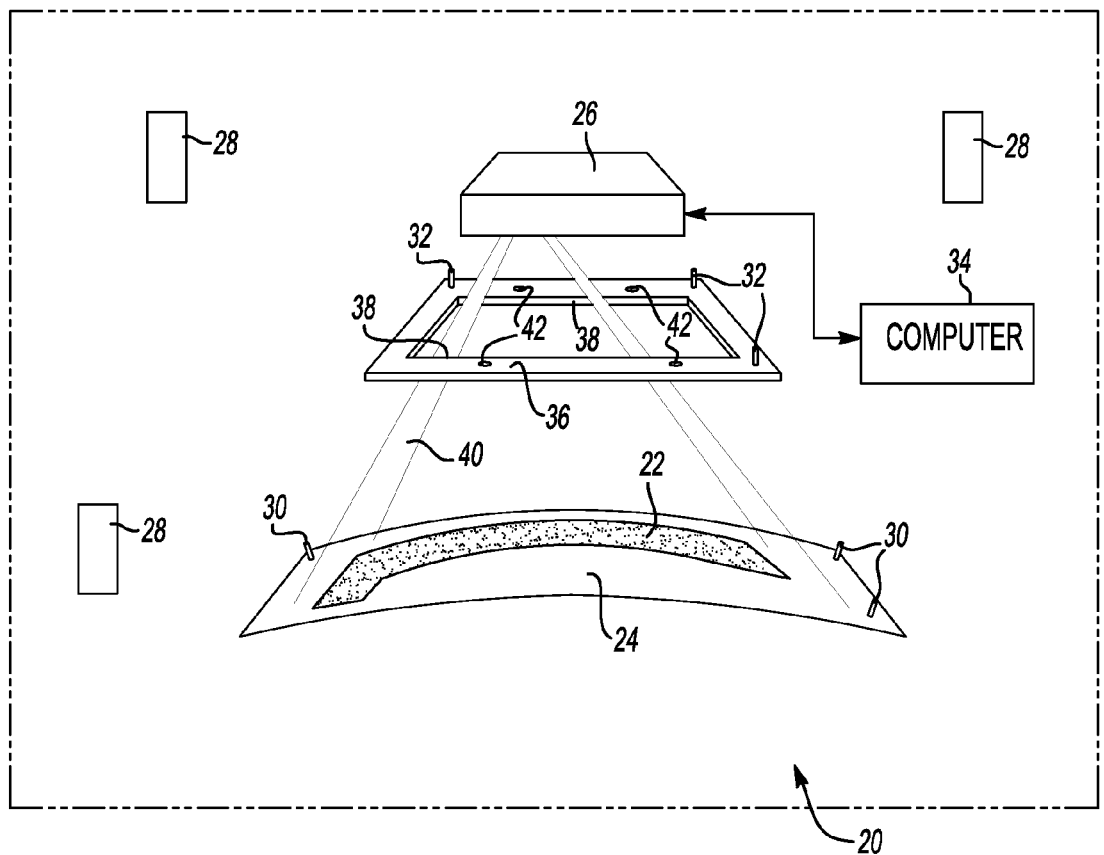
FIG. 1 is a partially schematic side elevation of the basic components of a targetless laser projection system of this invention and method of projecting a laser template on a target surface.

FIG. 1 illustrates schematically one embodiment of a targetless laser projection system 20 and method of this invention for projecting a laser template 22 on a target surface 24 with a laser projector 26. The laser projector 26 may be any conventional laser projector, such as the LPS1 laser projector available from the assignee of this application. The disclosed embodiment of the targetless laser projection system 20 shown in FIG. 1 includes a plurality of metrology transmitters 28 at fixed locations preferably within the work area, such as the indoor GPS infrared light metrology transmitters available from Arc Second, Inc. of Dulles, Va. or the laser trackers described above. Alternatively, other transmitter metrology devices may be utilized, as described above, including but not limited to, laser theodelite transmitter tracking devices, optical photogrametery devices, camera based systems, other infrared transmitter metrology devices and other tracker projection devices. The targetless laser projection system 20 further includes a first plurality of metrology receivers or reflectors 30 at fixed locations relative to the target surface 24 and a second plurality of metrology receivers or reflectors 32 at fixed at locations relative to the laser projector 26. Hereinafter, for ease of description, it will be understood that the term "metrology receivers" includes both active receivers, such as for example only indoor GPS receivers described in the above referenced U.S. Patents of Arc Second Inc., and passive devices, such as mirrors or reflectors, in combination with sensors or receivers which may for example, be on the metrology transmitters or laser trackers. Thus, in either embodiment, the metrology receivers 32 will include a sensor associated with the receiver either as a component of the metrology receiver or a reflector reflecting a signal from the metrology projectors 30 to a sensor which may be located on the projectors 30.

As described above, the method of projecting a laser template 22 on a target surface 24 of this invention includes first independently determining a position and orientation of The target surface 24 using an external metrology device. In the embodiment of the targetless laser projection system 20 shown in FIG. 1, this is accomplished by the combination of the metrology transmitters 28 and the metrology receivers 30, wherein a signal, such as an infrared light beam, is transmitted from the plurality of metrology transmitters 28 to the first plurality of metrology receivers 30 at fixed locations relative to the target surface 24. The data from the metrology receivers 30 is then transmitted to a computer 34 which determines the precise position and orientation of the target surface 24 using computer algorithms as is known in this art and described in the above-referenced patents of the assignee and Arc Second, Inc. The method of this invention further includes independently determining a position and orientation of the laser projector 26 using the combination of the metrology transmitters 28 and the second plurality of metrology receivers 32 at fixed locations relative to the laser projector or the metrology receivers 32 as described further below with regard to one preferred embodiment of the laser projector and frame assembly. The data from the second plurality of metrology receivers 32 is also transmitted to the computer 34 and the computer 34 then determines the position and orientation of the laser projector 26 and the precise position of the laser projector 26 relative to the target surface 24 and the first plurality of metrology receivers 30 using known algorithms. The laser from the laser projector 26 is then oriented relative to the target surface 24 to project a laser template 22 on the target surface 24 at a predetermined or defined location and orientation without the requirement of laser targets on the target surface 24 or metrology receivers within a field of view of the laser projector 26.

In the embodiment of the targetless laser projection system 20 shown in FIG. 1, the second plurality of metrology receivers 32 are mounted on a frame 36 preferably but not necessarily fixed relative to the laser projector 26 having an opening 38 therethrough through which the laser 40 may be projected to generate the laser template 22. As shown, the target surface 24 preferably includes at least three metrology receivers 30 and at least three metrology receivers 32 are fixed locations relative to the laser projector 26 or fixed relative to laser targets 42. The targetless laser projection system 20 shown in FIG. 1 thus may also be used to correct for laser image drift or movement of the laser projector 26. In the disclosed embodiment, the frame 36 includes a plurality of laser targets 42, such as retroreflective or active laser targets opposite the laser projector and within the field of view of the laser projector 26 and the laser projector periodically scans or tracks the position and orientation of the laser targets 42 and the data is then fed to the computer 34 and a control (not shown) for the positioning of the laser of the laser projector then corrects for laser image drift as is known in this art. However, as set forth above, a conventional laser imaging system described above requires laser targets on the target surface 24 within a field of view of the laser projector 26. The laser targets 42 are also located at fixed locations on the frame 36. In a preferred embodiment, the laser projection system includes at least four laser targets 42 as shown in FIG. 1. As set forth above, a conventional laser projector also includes a sensor (not shown) which, when retroreflective laser targets are used, receives a reflection from the laser targets 42 for determining the position and orientation of the laser projector 26 for correction of laser image drift as known in this art.

FIGS. 2 to 5 illustrate an actual application of the targetless laser projection system and method of this invention for projecting laser templates on an aircraft 44. As will be understood by those familiar with aircraft design and construction, a laser projection system may be utilized to project a laser template on the aircraft for various applications including, for example, mounting of various fixtures or components on the aircraft and the application of appliques, including insignias and other markings following construction of the aircraft. In a typical application, for example, the components of the aircraft 44 may be assembled and the joints between the components may then be covered with a carbon fiber composite material which must be accurately located on the aircraft. However, as set forth above, the targetless laser system and method of this invention is not limited by the application, and the application of the laser projection system and method of this invention for projecting a laser template on the aircraft 44 is for illustrative purposes only. However, in the embodiment of the targetless laser projection system shown in FIGS. 2 to 5, the target surface is an aircraft 44.

Figure 3:
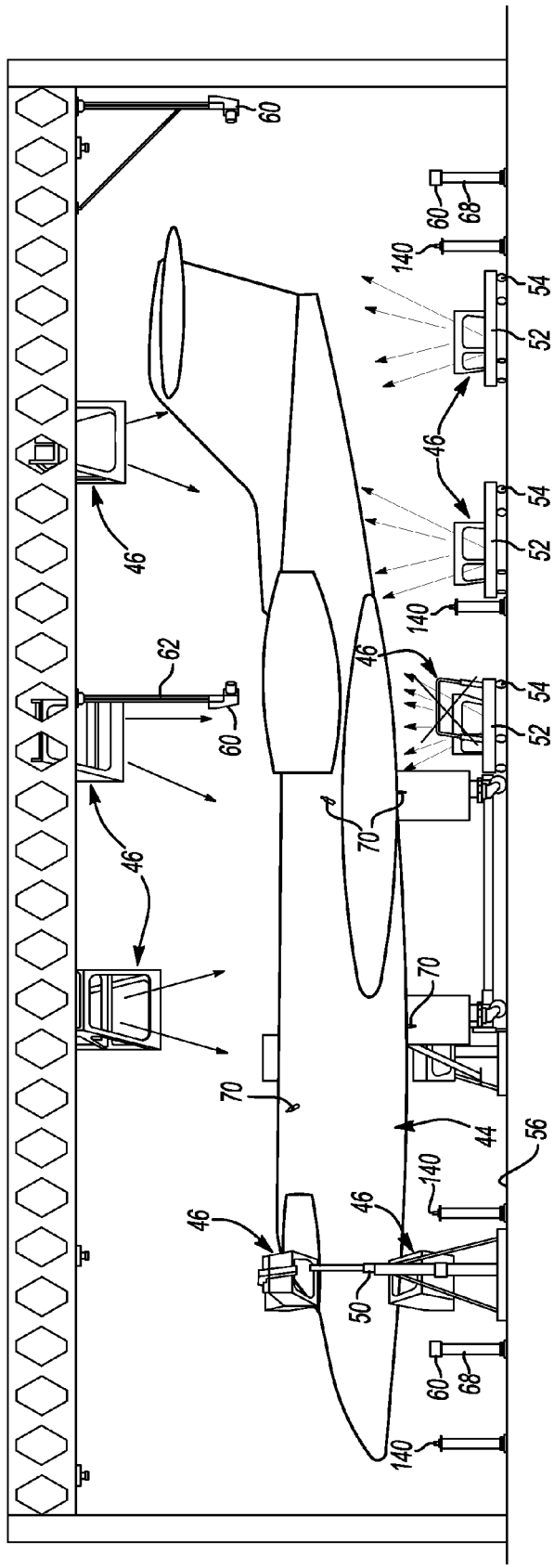
FIG. 3 is a side view of FIG. 1.
Figure 4:
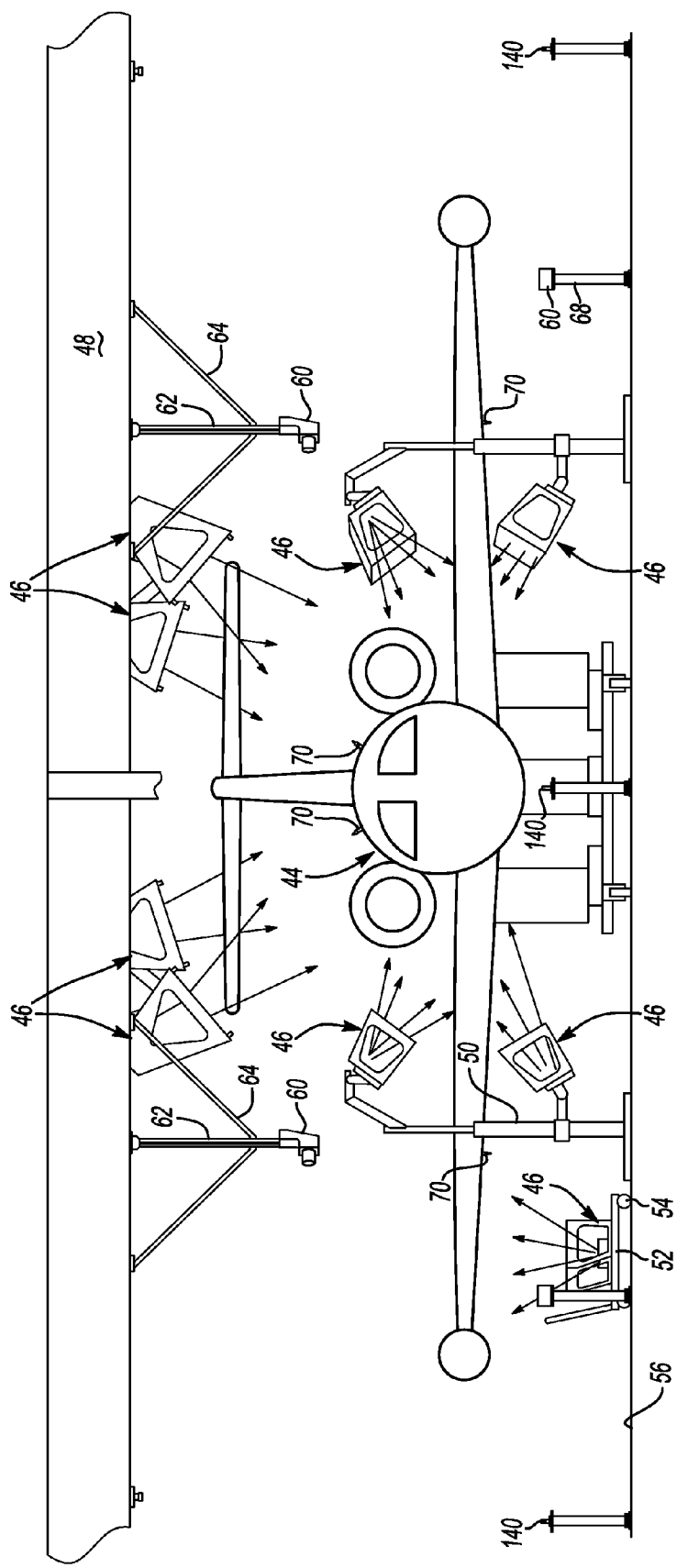
FIG. 4 is an end view of FIGS. 2 and 3.

As shown in FIGS. 2 to 5, the disclosed embodiment of the targetless laser projection system of this invention includes a plurality of laser projector and frame assemblies 46 which project laser templates onto the aircraft 44 through the frame assembly as described below with reference to FIGS. 6 and 7. Some of the laser projector and frame assemblies 46 are mounted on beams 48 which form part of the ceiling structure of the workstation or bay which receives the aircraft 44 for various applications, such as attachment of fixtures or components or application of appliques, such as insignias, identification, etc. The laser projector and frame assemblies 46 attached to the upper beams thus project downwardly onto the aircraft 44. Some of the laser projector and frame assemblies are mounted on adjustable stands or stanchions 50 as shown in FIGS. 3 and 4, wherein the adjustable stands 50 may include two or more laser projector and frame assemblies 46. Further, some of the laser projector and frame assemblies 46 are mounted on hand carts or trolleys 52 having wheels 54, such that the laser projector and frame assemblies 46 mounted on the hand carts 52 may be easily moved from place to place on the floor 56 of the workstation. The carts 52 may include an adjustable support (not shown) to tilt the frame assembly 46. All of the laser projector and frame assemblies 46 are movable relative to the support and the aircraft 44. In one preferred embodiment, the laser projector and frame assemblies 46 are mounted on universal joints 58 shown in FIGS. 6 and 7 described below.

Figure 5:
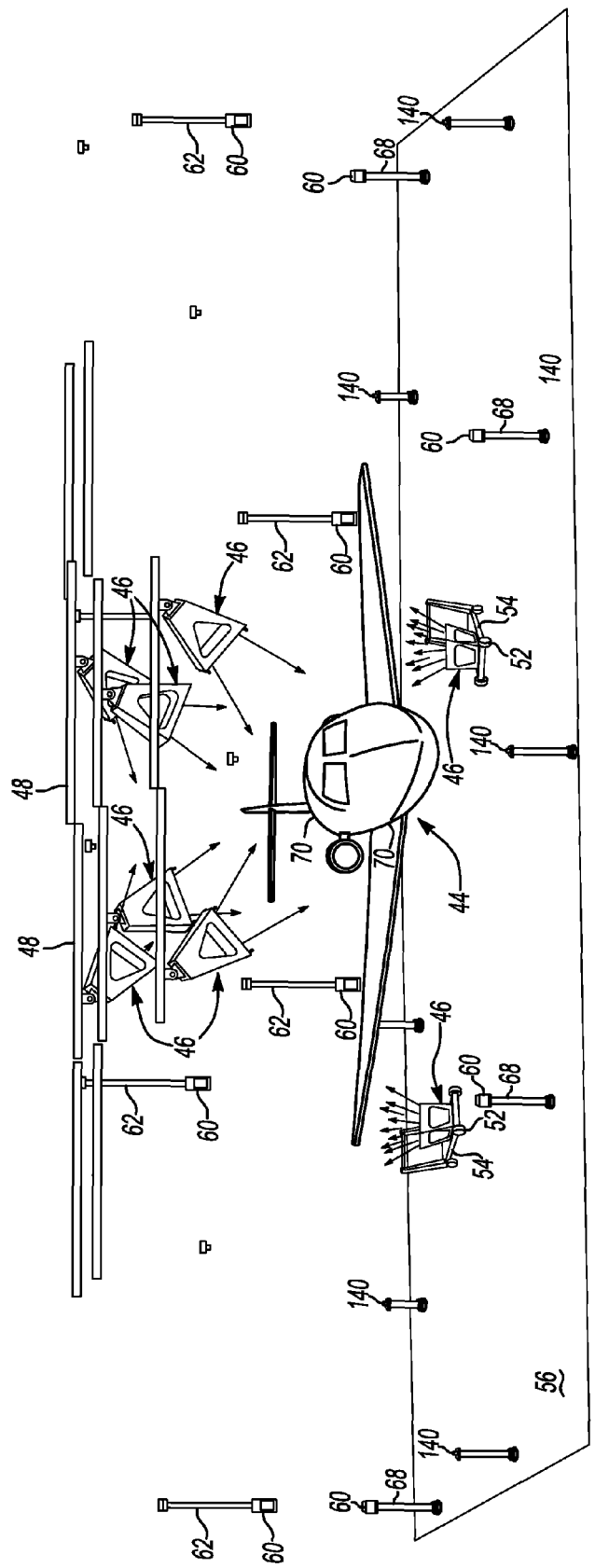
FIG. 5 is a front partial view of FIGS. 2 to 4 with upper portions of the roof assembly removed for a clearer understanding of FIGS. 2 to 4.

The targetless laser imaging or projection system shown in FIGS. 3 to 5 further includes a plurality of metrology transmitters 60, such as GPS infrared light transmitters, laser trackers or other metrology transmitters, as described above, located at fixed positions and orientations mounted from both the ceiling beams 48 and the workstation floor 56. The metrology transmitters 60 mounted on the beams 48 are supported in fixed relation by stanchions 62 and struts 64 as best shown in FIG. 4. The floor mounted metrology transmitters 60 are mounted on rigid floor supports 68, which are preferably kinematic supports, wherein the metrology transmitters 60 may be removed from and replaced on the floor supports 68 without changing the position and orientation of the metrology transmitters as further described below.

The targetless laser imaging system shown in FIGS. 2 to 5 further includes a first plurality of metrology receivers 70 as defined above fixed relative to the target surface which, in the disclosed embodiment, is an aircraft 44. As will be understood by those skilled in this art, a commercial or military aircraft has a number of jack and lift points at precisely known locations normally including a socket, as described below with regard to FIGS. 8 to 10. The first plurality of metrology receivers 70 may be rigidly fixed and oriented relative to the precisely known jack and lift points in most commercial and military aircraft. Alternatively, where the target surface is other than an aircraft, the metrology receivers 70 may be fixed at predetermined locations and orientations as described above with regard to FIG. 1. The number of the first plurality of metrology receivers 70 will depend upon the application. As described above, the combination of the metrology transmitters 60 at fixed locations and the first plurality of metrology receivers 70 at fixed known locations permit the computer (not shown in FIGS. 2 to 5) to determine the precise location and orientation of the aircraft 44.

Figure 6:
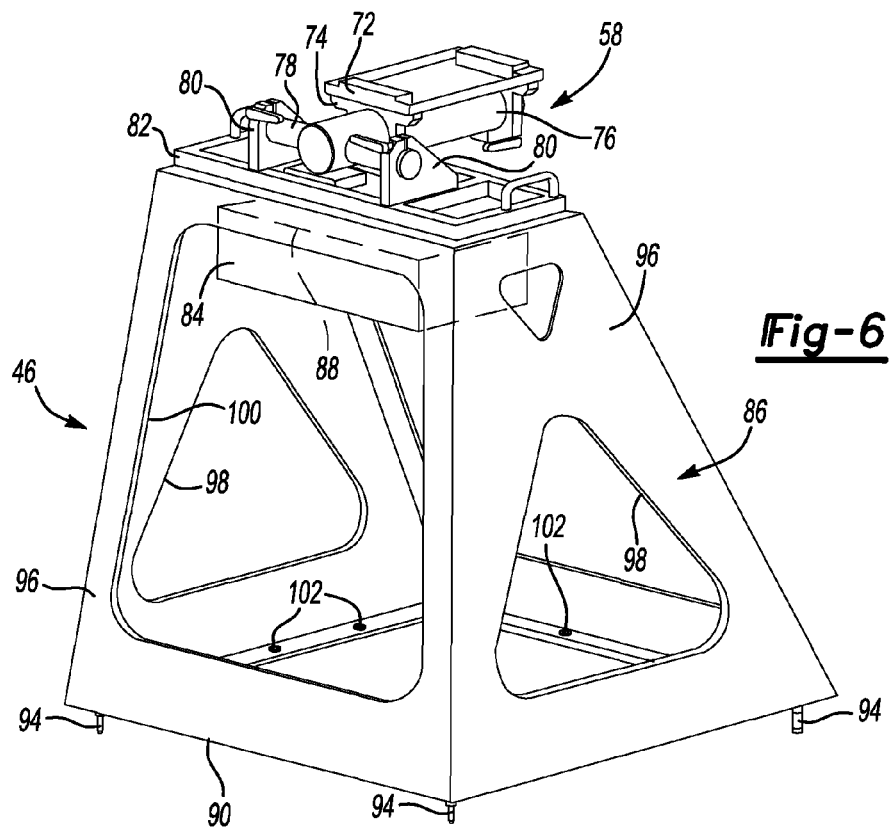
FIG. 6 is a side perspective view of one embodiment of a laser projector and frame assembly of this invention shown in FIGS. 2 to 5.
Figure 7:
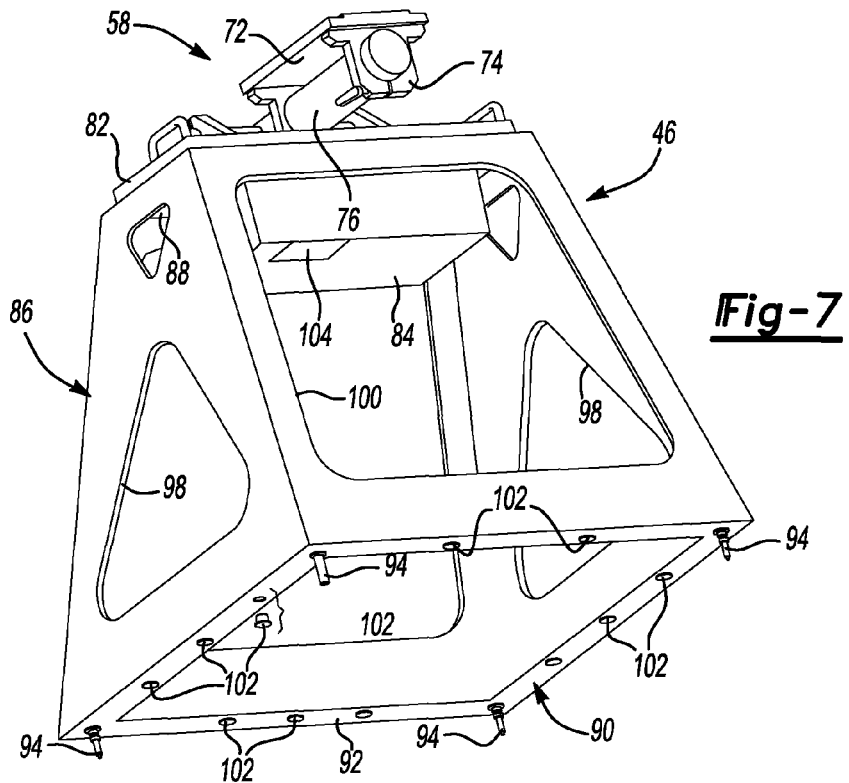
FIG. 7 is a side perspective view of the laser projector and frame assembly shown in FIG. 6 with the frame tilted on the universal support.

FIGS. 6 and 7 illustrate one preferred embodiment of the laser projector and frame assembly 46 shown in FIGS. 2 to 5. As stated above, the laser projector and frame assembly 46 may be supported on a universal support 58 which preferably permits movement or rotation of the frame assembly 46 in at least two axes. The disclosed embodiment of the universal joint 58 includes a support plate 72 which may be attached to the support for the laser projector and frame assembly 46 and attached to the ceiling beams 48, the adjustable stands 50 or the support structure for the trolleys 52 shown in FIGS. 3 to 5 and described above. The support plates 72 in the disclosed embodiment include two end bosses 74 which receive a primary pin or pivot rod 76 and the pivot rod 76 includes a cross rod 78, which is pivotally supported on brackets 80 on the primary support plate 82 of the projector and frame assembly 46. Thus, the projector and frame assembly 46 may be pivoted or rotated about the axes of the pivot rod 76 and the cross rod 78 to adjust the orientation of the laser projector 84 relative to the target surface, such as the aircraft 44 shown in FIGS. 2 to 5. As will be understood, however, the laser projector and frame assembly 46 may be supported by any suitable support assembly, but the support assembly preferably includes a universal joint or assembly which permits adjustment of the orientation of the laser projector 84.

In a preferred embodiment of the frame 86 of the laser projector and frame assembly 46, the frame 86 includes a proximal support surface 88 and a distal open end 90. As used herein, for reference purposes only, the proximal end of the frame 86 is adjacent to the laser projector 84 and the distal end 90 is furthest from the projector 84. The distal open end 90 which, in the disclosed embodiment, is rectangular, includes an outer surface 92 shown in FIG. 7, having a second plurality of metrology receivers 94 which may project therefrom as shown. In a preferred embodiment of the laser projector and frame assembly 46, the laser projector 84 is rigidly supported on the proximal support surface 88 and the second plurality of metrology receivers 94 are fixed at predetermined positions and orientations relative to the laser projector 84. Thus, as described above with regard to FIG. 1, the metrology transmitters 60 shown in FIGS. 2 to 5, transmit a signal, such as an infrared laser light signal, to the second plurality of metrology receivers 94, located at fixed locations and orientations relative to the laser projector 84 to determine the precise position and orientation of the laser projector 84 in FIGS. 6 and 7. The frame 86 is preferably formed of a material which has a low co-efficient of expansion and contraction, such as a honeycomb carbon fiber. The frame 86 is also preferably integrally formed, such that the second plurality of metrology receivers 94 are fixed relative to the laser projector 84. A suitable material for this application is NOMEX® available from E.I. Du Pont de Nemours and Company, which forms a rigid carbon fiber structure having a very low co-efficient of expansion and contraction. In the disclosed embodiment of the frame, the integrally formed frame includes strut portions 96 interconnecting the proximal support surface 88 with the distal open end 90 having triangular and rectangular openings 98 and 100, respectively, to further reduce weight and form a rigid structure.

In a preferred embodiment of the laser projector and frame assembly 46 of this invention, the distal open end 90 of the frame 86 includes a plurality of laser targets 102, such as conventional retroreflective laser targets commercially available from the assignee of this application. As best shown in FIG. 6, the laser targets 102 are located within a field of view of the laser projector and fixed relative to the laser projector, such that the laser projector 84 periodically scans the laser targets 102 to correct for laser image drift and to determine the location of the laser projector 84 where the laser projector 84 is not fixed relative to the frame assembly 46 as described. Where the laser targets 102 are retroreflective targets, the laser beam is reflected back to a sensor in the laser projector 84 (not shown) to control a mirror in the laser projector and correct for laser image drift as is known in this art. However, as discussed above, in a conventional laser imaging system, the laser targets are fixed at locations on or adjacent the target surface. The laser projector 84 includes a window 104 opposite the open distal end 92 of the frame 86 and the laser beam is then projected through the open distal end 92 of the frame 86. As will be understood from the above description, an object of the laser projection and frame assembly 46 of this invention is to determine the position and orientation of the laser projector 84 relative to the metrology transmitters 60 (shown in FIGS. 2 to 5) and thus the position and orientation of the laser projector 84 relative to the target surface 44. This can be accomplished by fixing the laser projector 84 relative to the metrology receivers 94 on the frame 86, as described above. Alternatively, where the frame 86 also includes laser targets 102, the laser targets 102 may be fixed relative to the metrology receivers 94 and the laser projector 84 may then be movable or at an "unknown" location relative to frame assembly 46 and the position and orientation of the laser projector 84 may then be precisely determined by scanning the laser targets 102 with the laser projector 84 because the laser targets 102 are fixed relative to the metrology receivers 94. Thus, the location of the laser targets 102 on the frame 86 within a field of view of the laser projector 84 may be used to determine the location and orientation of the laser projector 84 relative to the target surface.

FIGS. 8 to 10 illustrate two alternative embodiments for rigidly mounting a "vector bar" metrology receiver system, such as a GPS infrared light receiver as now described. As is known in this art, the vector bar 106 includes two sensors or metrology receivers 108 and 110 which are spaced a predetermined distance on a common axis, such that the GPS metrology system can accurately and precisely determine the position and orientation of the metrology receivers 106. Such vector bars are commercially available from Arc Second, Inc. and thus no further description of the vector bar is necessary for a person skilled in this art. Alternatively, the metrology receivers may include a plurality of mirrors, CMM or other reflector which reflect a signal from the metrology transmitters back to a sensor of the metrology transmitters or laser trackers. As set forth above, the first plurality of metrology receivers 70 in FIGS. 2 to 5 are fixed at predetermined locations and orientations relative to the aircraft 44, such as the hoist and lift points of the aircraft which are typically located at the bulkheads and are precisely known in any commercial or military aircraft. Although not relevant to the targetless laser projection system of this invention, the metrology receiver assembly shown in FIG. 8 is for mounting the vector bar 106 under the wing of the aircraft and the embodiment of the vector bar mounting assembly shown in FIGS. 9 and 10 was designed for the forward installations. As set forth above, the preferred mounting will depend upon the application and the mounting available on the aircraft 44 or other target surface.

The mounting assembly 112 for the vector bar 106 shown in FIG. 8 includes a bushing or aircraft interface fixture 112 having a tubular end portion 116 received in a cylindrical opening in the aircraft 44 typically under the wing of the aircraft having a spherical seat 118 receiving a bearing 120 having a spherical end portion 122. The bearing is rigidly fixed to the bushing 312 by a locking nut 124 having a helical internal surface 126 as shown in FIG. 10 and a locking ring 127. The assembly is rigidly retained together by bolts 128 each having a threaded end portion 130, as shown in FIG. 10, which threadably receive balls or spheres 132 having a threaded opening 134. The spheres or balls 132 are preferably formed of a relatively rigid polymeric material, such as Nylon, whereon one end ball 132 is received in the tubular end portion 116 of the bushing 114 and the opposed ball 132 is received in the helical internal surface 126 of the locking nut 124, such that upon turning of the locking nut 124, the bolts 128 are tensioned, rigidly locking the vector bar metrology receiver assembly in place. Because of the spherical interface between the bushing 114 and the bearing 120, the vector bar 106 may be oriented prior to locking the assembly in place. The mounting assembly for the vector bar 106 shown in FIGS. 9 and 10 is similar, but not identical to the mounting assembly 112 shown in FIG. 8. In the mounting assembly 136 shown in FIGS. 9 and 10, the bushing 114 and bearing 120 has been replaced by the aircraft interface fixture 138 shown in FIG. 10, but is otherwise identical to the mounting assembly 112 shown in FIG. 8.

As will be understood from the above description, the mounting assemblies 112 and 136 rigidly mount the vector bar metrology receiver 106 fixed known locations, providing an accurate location for the metrology receivers in a predetermined orientation such that the metrology device can accurately locate both the location and orientation of the aircraft 44 in FIGS. 2 to 5 and the aircraft may be moved to any suitable location within the bay or workstation for subsequent operations or maintenance as required. In one preferred embodiment of the targetless laser imaging or projection system shown in FIGS. 2 to 5, the system further includes a third plurality of metrology receivers 140 which, in the disclosed embodiment, are floor mounted. The third plurality of metrology receivers 140 provide additional data to the computer (not shown) and further accuracy of the metrology system, particularly the location and orientation of the aircraft 44. However, because the third plurality of metrology receivers 140 are floor mounted, it would be desirable to remove the metrology receivers 140 as the aircraft or other part is received in the workstation and replace the metrology receivers 140 without modifying the position and orientation of the receivers.

Figure 13:
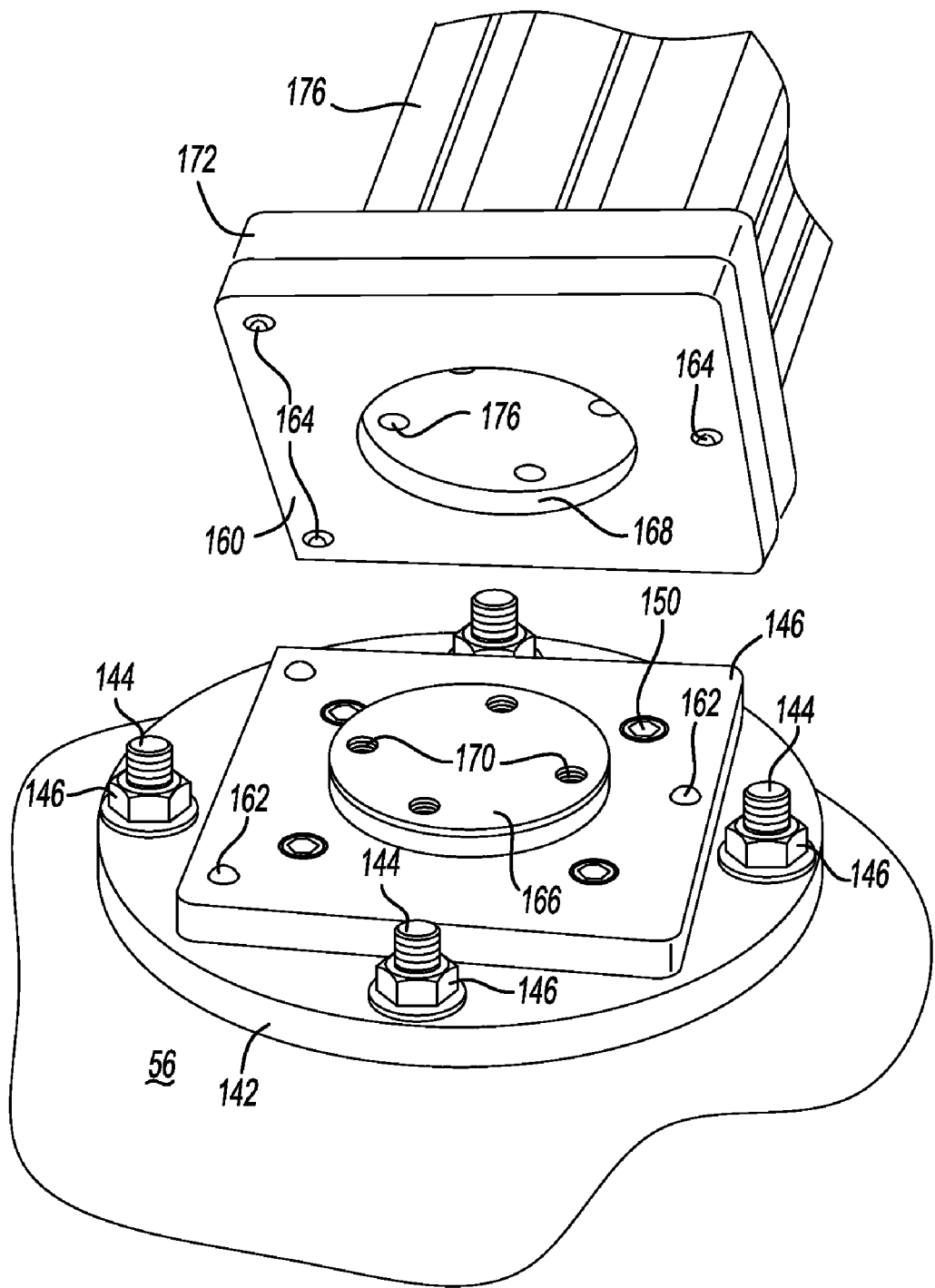
FIG. 13 is a partial side perspective view of FIG. 12 with the metrology receiver support removed.

FIGS. 11 to 13 illustrate one preferred embodiment of a kinematic mount for the metrology receivers 140 as now described. The disclosed embodiment of the kinematic mount includes a mounting plate 142 which is permanently and rigidly attached to the floor 56 of the workstation, such as by bolts 144 which are set into the floor as shown in FIG. 12. The mounting plate 142 is secured to the floor by nuts 146 or other suitable means. A gasket (not shown) may be received between the mounting plate 142 and the floor 56. A bottom kinematic plate 148 is secured to the mounting plate 142 by any suitable means, such as screws 150 shown in FIG. 13. As will be understood from the following description, the metrology receivers 140 may then be removed from the low profile support plate 142 and bottom kinematic plate 148 for receipt of the aircraft 44 in the workstation and replaced without changing the position and orientation of the metrology receivers 140. The disclosed embodiment of the kinematic mount assembly further includes a top kinematic plate 160 which is releasably retained to the bottom kinematic plate 146 in a predetermined orientation as now described. In the disclosed embodiment, the bottom kinematic plate 146 includes three projections which, in the disclosed embodiment, are spring biased balls or spheres 162 and the lop kinematic plate 160 includes three hemispherical depressions 164 which receive the spherical balls 162, orienting the top kinematic plate 160 relative to the bottom kinematic plate 146 as shown in FIG. 13.

In the disclosed embodiment of the kinematic mount, the bottom kinematic plate 146 further includes a central cylindrical magnet 166, as shown in FIG. 13 and the top kinematic plate 160 includes a cylindrical opening 368 which receives the cylindrical magnet 166, releasably retaining the top kinematic plate 160 to the bottom kinematic plate 146. The magnet 166 may be retained to the bottom kinematic plate 146 by any suitable means, such as screws (not shown) received in the threaded openings 170. The mounting assembly further includes a support plate 172 secured to the top kinematic plate 160 by screws or bolts 174 shown in FIG. 11. The support plate 172 supports a metrology receiver support stanchion 176 which is attached to the support plate 172 by suitable fasteners, such as screws (not shown) received in threaded openings 176 shown in FIG. 13. The kinematic support assembly further includes a top plate 180 having finger holes 182 forming handles for lifting the upper assembly, including the top kinematic plate 160 from the bottom assembly, including the bottom kinematic plate 146. The sensor or metrology receive is not shown in FIGS. 11 and 12, but is enclosed within a cup-shaped cap 184 retained to the top plate 180 by any suitable fasteners, such as screws 186 shown in FIGS. 11 and 12.

As will now be understood from the above description, the floor mounted metrology receivers 140 may be easily removed from the floor 56 by lifting the top plate 180, thereby lifting the stanchion 176, support plate 172 and the top kinematic plate 160 from the bottom kinematic plate 146 and the mounting plate 142 to receive an aircraft 44 for example, into the workstation shown in FIGS. 2 to 5 and the assembly may then be replaced by mounting the top kinematic plate 160 on the bottom kinematic plate 146 and accurately oriented by receiving the balls 162 in the bottom kinematic plate 146 in the hemispherical openings 164 in the top kinematic plate 160, accurately realigning the assembly. In one preferred embodiment, the stanchion is formed of a lightweight rigid material which has a low co-efficient of expansion and contraction, such as extruded aluminum and the ends of the stanchion 176 are preferably machined flat to assure accurate alignment of the metrology receiver. The floor mounted metrology transmitters 60 shown in FIGS. 3 to 5 may be similarly mounted on kinematic supports, such that the metrology transmitters 60 may be easily removed and replaced without changing the orientation and location of the floor mounted metrology transmitters.

Figure 14:
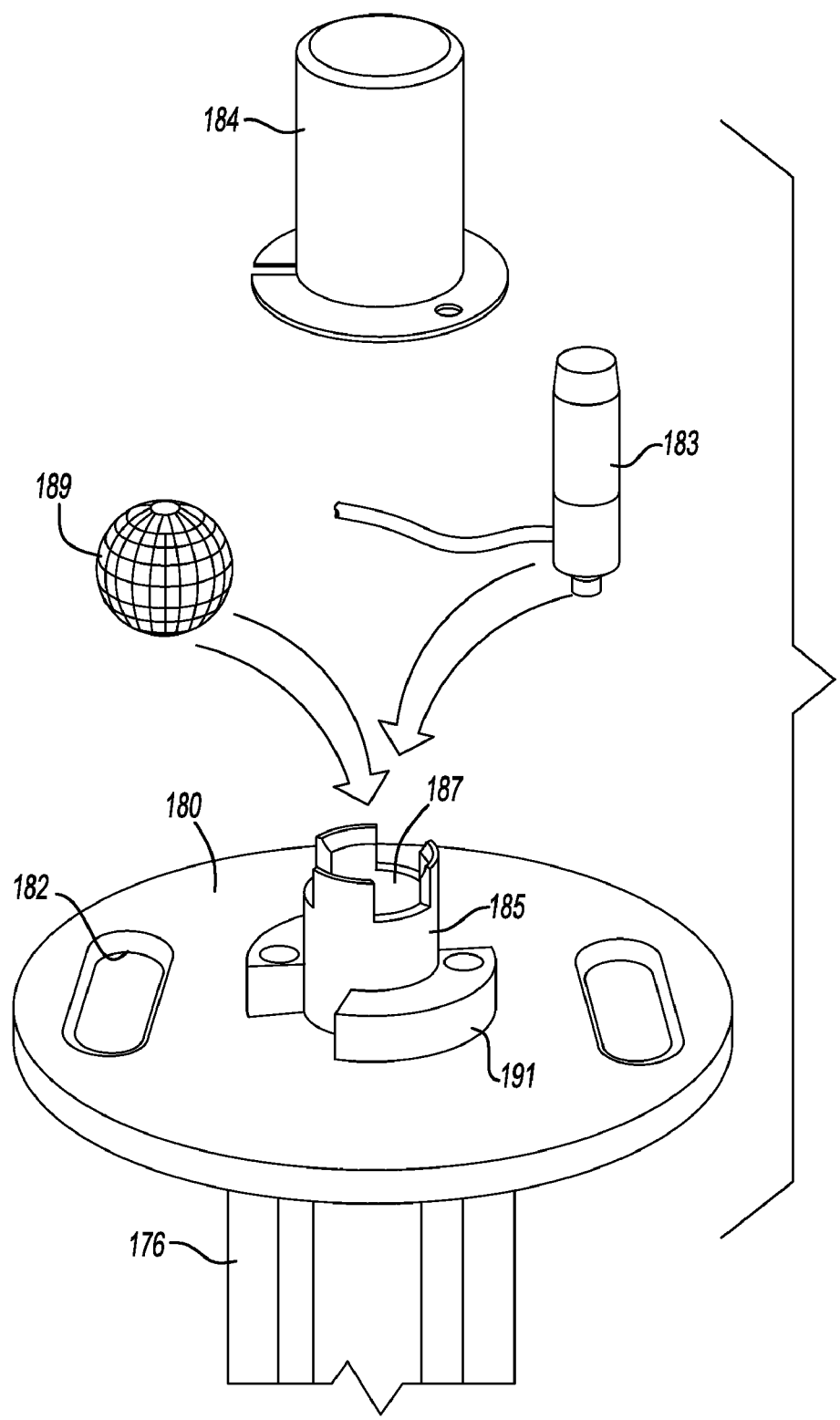
FIG. 14 is an exploded side view of an alternative embodiment of a metrology sensor and support assembly also illustrating a laser reflective CMM target or sensor of a laser tracker for independently determining the location and orientation of the metrology sensor.

FIG. 14 illustrates a further refinement of the laser imaging system of this invention which provides for independent determination of the precise location and orientation of the metrology receiver or sensor 180. As discussed above with regard to FIGS. 11 to 13, the metrology receiver 183 may be supported on a kinematic support, including stanchion 176 and top plate 180 for removal and replacement of the metrology receiver 183 without changing the position or orientation of the metrology receiver 183. However, in this embodiment, the top plate 180 includes a cylindrical cup-shaped enclosure or receptacle 185 having an opening 187 specifically configured to receive and orient either a conventional metrology receiver 183, such as an infrared light GPS receiver, or a laser reflector 189 of an independent CMM device. The disclosed embodiment of the laser reflector 189 is a spherically mounted reflector (SMR). However, a corner cube reflector (CCR) photogrametric target, retroreflective laser target or other CMM sensor or reflector may also be utilized. Because the opening 187 of the cup-shaped receptacle 185 is specifically adapted to receive and accurately orient either the metrology receiver 183 or the laser reflector or receiver 189, the laser reflector receiver 189 may be inserted into the cup-shaped receptacle 185 to independently determine the top center location of the metrology receiver 183 by using a conventional laser tracker. The disclosed embodiment of the metrology receiver 183 is an indoor GPS infrared light receiver or sensor available from Arc Second, Inc. and the laser reflective SMR 189 and laser tracking devices are commercially available from various sources as described above. As will now be understood from the above description, the precise position and orientation of the metrology receiver 183 can thus be independently determined with a laser tracking device using a laser reflector, such as the SMR 189 shown in FIG. 14. The cup-shaped receptacle 185 in FIG. 14 is rigidly and accurately mounted on plate 180 by mounting blocks 191.

Figure 15:
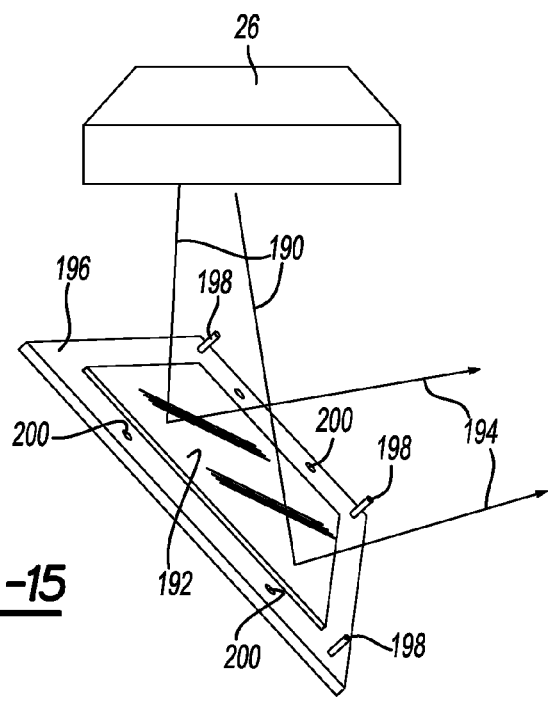
FIG. 15 is a side perspective partially schematic view of the use of the laser projection system with a mirror to project a laser template on a target surface outside the field of view of the laser.
Figure 2:
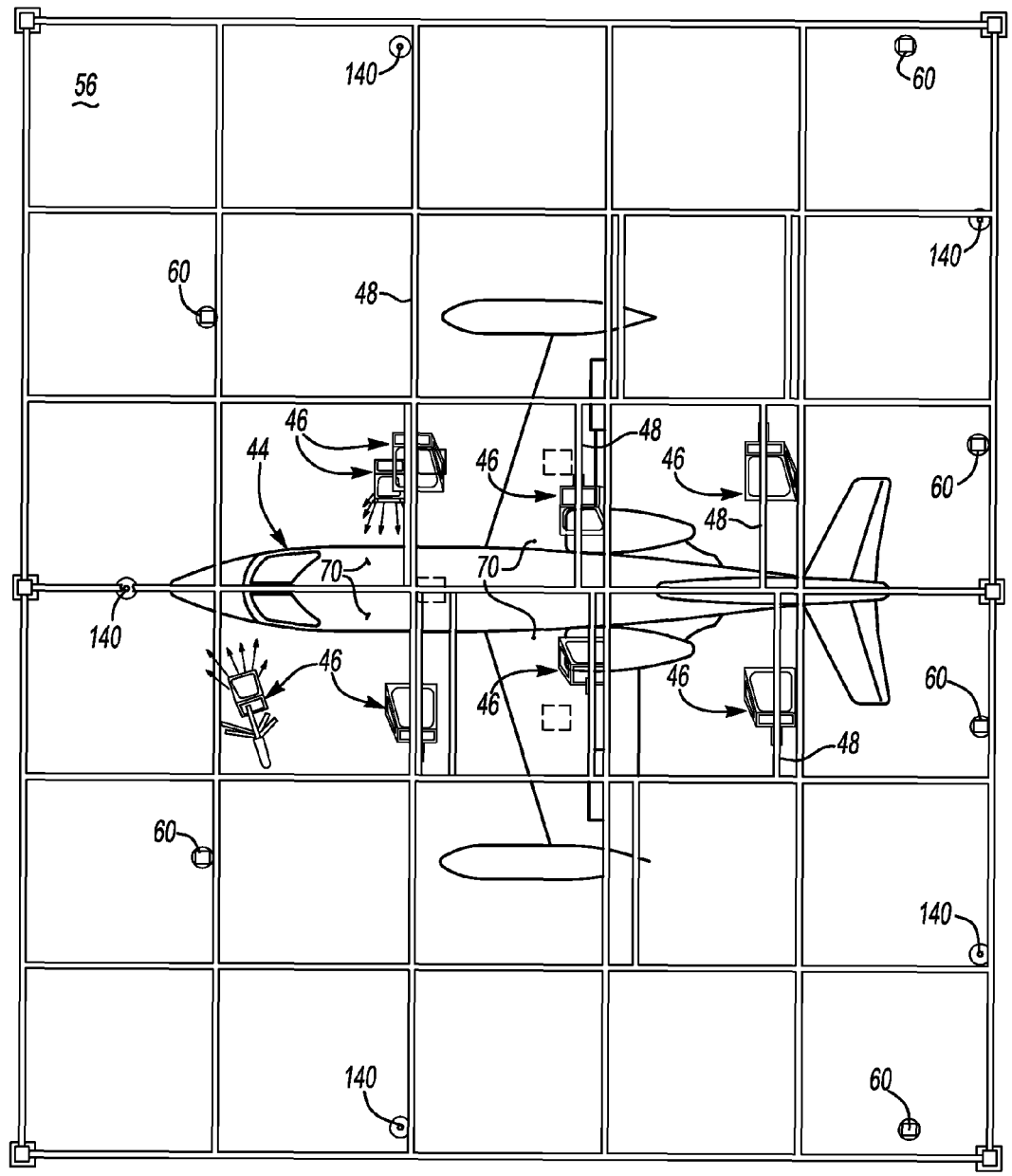
FIG. 2 is a top view of an embodiment of a workstation for projecting a laser template on an aircraft for subsequent operations.

FIG. 15 illustrates a modification of the laser imaging system 20 shown in FIG. 1 to project a laser template (not shown) on a target surface which is not within the field of view of the laser projector 26. In this embodiment, the laser projector 26 projects a laser beam 190 onto a mirror 192 or mirrored surface and the laser beam 190 is then reflected from the mirror 192 as shown by arrows 194 to project a laser template on a target surface (not shown) which may be outside the field of view of the laser projector 26. Alternatively, the mirror 192 may be utilized in a confined space to increase the size of the laser template. In the embodiment of the laser projection system shown in FIG. 15, the mirror is supported in a frame 196 having three metrology receivers 198 preferably fixed at predetermined locations relative to the laser projector 26 permitting the use of the laser imaging system in a targetless laser imaging system as described above. That is, the laser imaging system shown in FIG. 15 would include a plurality of metrology transmitters 28 (shown in FIG. 1) and the frame 196 may also include a plurality of laser targets 200 to compensate for laser image drift. However, in this embodiment, the laser targets 200 are preferably electronic targets as disclosed in the above-referenced U.S. Pat. No. 5,646,859, rather than retroreflective laser targets. Thus, the laser projection system shown in FIG. 15 may be otherwise identical to the laser projection system shown in FIG. 1, except that the laser template is reflected from the mirror 192 onto a target surface.

Figure 16:
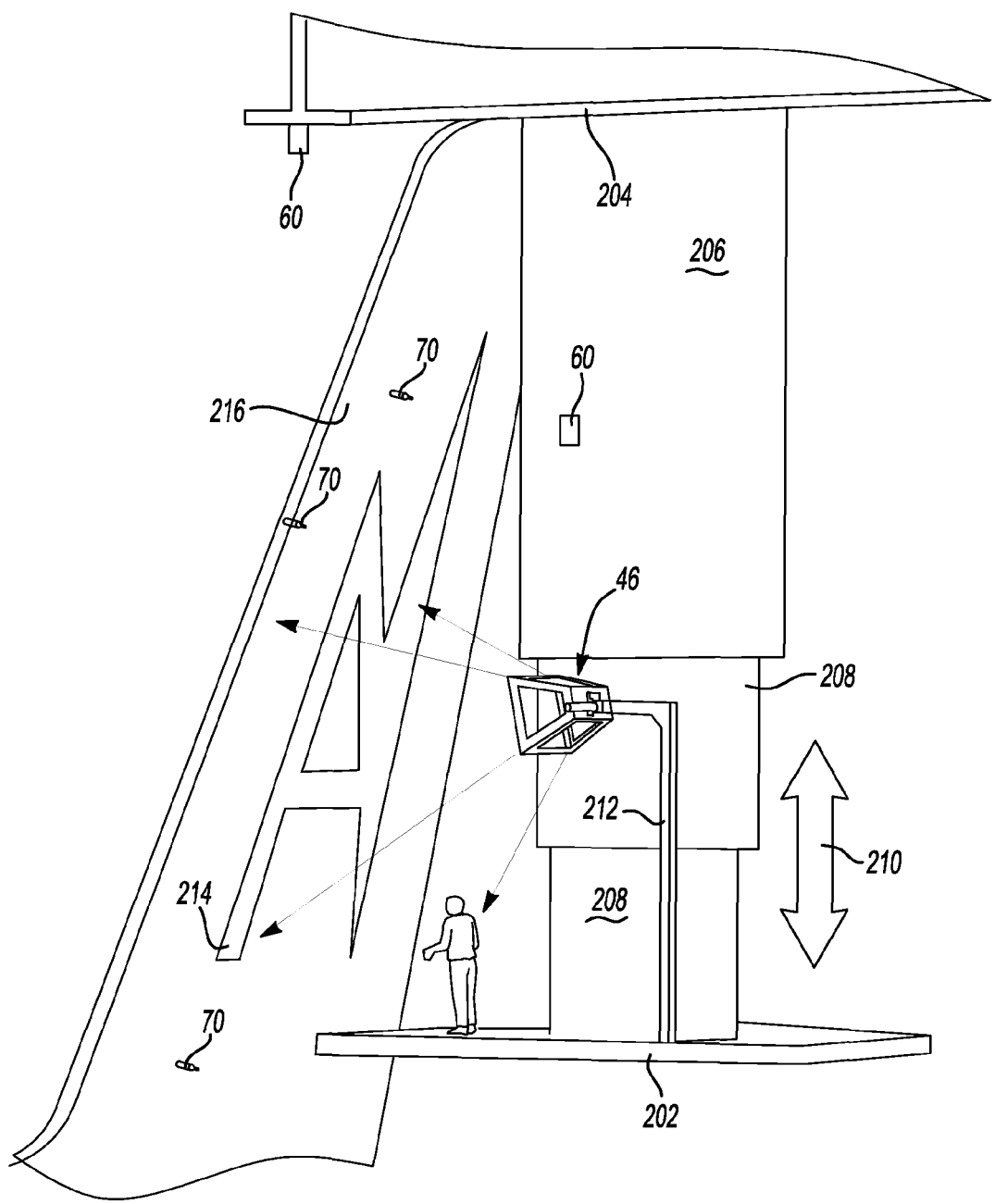
FIG. 16 is a side perspective view of the laser projection system of this invention mounted on a lift.

FIG. 16 illustrates a further use and application of a targetless laser system of this invention, wherein a laser projector and frame assembly 46 is mounted on a platform 202, which is mounted on a telescopic piston and cylinder assembly supported by a roof beam 204, for example. In the disclosed embodiment, a pneumatic or hydraulic cylinder 206 is fixed to the roof beam 204 and the vertical cylinder 206 telescopically receives a plurality of telescopic pistons 208 connected to the platform 202, such that the platform 202 may be raised or lowered as shown by arrow 210. In the disclosed embodiment, the laser projector and frame assembly 46 is supported on the platform by an L-shaped stanchion or frame 212 to project a laser template 214 on the tail 216 of an aircraft. As will be understood, however, the laser imaging system shown in FIG. 16 may be utilized to project a laser template on any large surface, particularly a large surface located above the floor of a workstation (not shown). The laser projection system shown in FIG. 16 may be otherwise identical to the laser projection system shown in FIGS. 2 to 5, including a plurality of metrology transmitters 60 and a first plurality of metrology receivers 70 fixed at predetermined known locations relative to the tail 216 of the aircraft. As shown, the platform 202 is large enough to receive personnel for application of a decal to the laser template 214.

As will be understood from the above description of preferred embodiments of this invention, various modifications may be made to the disclosed laser projection systems and methods of this invention within the purview of the appended claims. For example, as described above, various metrology devices may be utilized with the targetless laser imaging system of this invention and this invention is not limited to the indoor infrared light GPS systems as described and disclosed in the above-referenced U.S. patents of Arc Second, Inc. Other metrology devices may also be used, including laser field light tracking devices, optical photogrametry devices, camera based systems and other laser tracker metrology systems. More specifically, the metrology transmitters may project a laser onto a reflective surface of the metrology receivers which is reflected to a sensor or receiver on or connected to the metrology receivers or a laser tracker metrology system. Further, the targetless laser projection system of this invention may be utilized to project a laser template on any target surface and the invention is not limited to aircraft applications. Further, the targetless laser projection system of this invention is not limited to the laser projector and frame assembly 46 disclosed and the targetless laser projection system of this invention may utilize other methods for correcting for laser drift, other than laser targets, as disclosed. It should also be understood that the use of a mirror to project a laser template on a target surface outside the field of view of the laser may also be utilized with conventional laser imaging systems. Having described several preferred embodiments of the laser imaging systems and methods of this invention, the invention is now claimed as follows.

The invention claimed is:

1. A laser imaging system for projecting a laser template on a target surface at a predetermined location and orientation, said laser imaging system comprising:
    a plurality of metrology transmitters located at fixed locations;
    a laser projector;
    a first plurality of metrology receivers at fixed predetermined locations relative to said target surface each having a sensor associated therewith to determine a position of said first plurality of metrology receivers;
    a second plurality of metrology receivers at fixed locations relative to said laser projector each having a sensor associated therewith to determine a position of said second plurality of metrology receivers;
    a computer receiving data from said sensors of said first and second metrology receivers of the location and orientation of said laser projector relative to said target surface; and
    a control receiving data from said computer orienting a laser from said laser projector to project said laser template on said target surface at said predetermined location and orientation.

2. The laser imaging system as defined in claim 1, wherein said laser imaging system includes a plurality of laser targets within a field of view of said laser projector and said computer sending a signal to said control controlling said laser projector to periodically scan said laser targets to compensate for laser image drift.

3. The laser imaging system as defined in claim 1, wherein said second plurality of metrology receivers are fixed at predetermined known locations on a frame within a field of view of said metrology transmitters.

4. The laser imaging system as defined in claim 3, wherein said frame has an opening therethrough and said laser projector projecting said laser template through said opening through said frame.

5. The laser imaging system as defined in claim 4, wherein said frame includes an open distal end portion, a proximal portion receiving said laser projector and said laser projector mounted on said proximal portion in fixed relation to project said laser template through said open distal end.

6. The laser imaging system as defined in claim 5, wherein said open distal end of said frame includes a plurality of laser targets opposite said laser projector within a field of view of said laser projector.

7. The laser imaging system as defined in claim 3, wherein said frame is mounted on a support movable relative to said target surface.

8. The laser imaging system as defined in claim 3, wherein said frame is mounted on a cart having wheels movable relative to said target surface.

9. The laser imaging system as defined in claim 3, wherein said frame is formed of a material having a low coefficient of expansion and contraction.

10. The laser imaging system as defined in claim 9, wherein said frame is integrally formed of a carbon fiber.

11. The laser imaging system as defined in claim 1, wherein said second plurality of metrology receivers are fixed on a frame supporting said laser projector in fixed relation and said frame is supported on a universal joint.

12. The laser imaging system as defined in claim 1, wherein said plurality of metrology transmitters are light transmitting metrology transmitters and said first and second plurality of metrology receivers are light receiving metrology receivers.

13. The laser imaging system as defined in claim 1, wherein said plurality of metrology transmitters are infrared light transmitting metrology transmitters and said first and second plurality of metrology receivers are infrared light receiving metrology receivers.

14. The laser imaging system as defined in claim 13, wherein said plurality of infrared metrology transmitters are indoor global positioning transmitters and said first and second plurality of metrology receivers are global positioning receivers.

15. The laser imaging system as defined in claim 1, wherein said metrology receivers include metrology receivers mounted on kinematic supports having a lower mounting plate fixed to a floor at predetermined fixed locations, an upper mounting plate releasably attached to said lower mounting plate and a receiver mounted on said upper mounting plate permitting removal and replacement of said metrology receivers and said upper mounting plate without modifying a location and orientation of said metrology receivers.

16. The laser imaging system as defined in claim 15, wherein said upper and lower mounting plates have interfitting elements orienting said upper mounting plate relative to said lower mounting plate.

17. The laser imaging system as defined in claim 16, wherein said upper mounting plate is releasable attached to said lower mounting plate by a magnet.

18. The laser imaging system as defined in claim 1, wherein said second plurality of metrology receivers include metrology receivers having a support including a cup-shaped receptacle configured to receive alternative receivers including one of said metrology receivers or a laser reflective receiver of a coordinate measuring machine to independently determine a position of said metrology receivers.

19. The laser imaging system as defined in claim 1, wherein said laser imaging system includes a third plurality of metrology receivers having a sensor associated therewith at fixed predetermined locations spaced from said target surface.

20. A laser imaging system for projecting a laser template on a target surface at a defined location and orientation, said laser imaging system comprising:
  a plurality of light transmitting metrology transmitters located at fixed locations;
  a first plurality of light receiving metrology receivers located at fixed predetermined locations relative to said target surface each having a sensor associated therewith;
  a laser projector movable relative to said target surface;
  a second plurality of light receiving metrology receivers located at fixed locations relative to said laser projector each having a sensor associated therewith;
  a computer receiving data from said sensors of said first and second metrology receivers determining a location and orientation of said laser projector relative to said target surface; and
  a control for orienting a laser of said laser projector relative to said target surface and orienting said laser of said laser projector relative to said target surface to project a laser template on said target surface at said defined location and orientation.

21. The laser imaging system as defined in claim 20, wherein said plurality of light transmitting metrology transmitters are infrared light metrology transmitters and said first and second plurality of light receiving metrology receivers are infrared light receiving metrology receivers.

22. The laser imaging system as defined in claim 20, wherein said light transmitting metrology transmitters are global positioning infrared metrology transmitters and said first and second plurality of light receiving metrology receivers are global positioning infrared light metrology receivers.

23. The laser imaging system as defined in claim 20, wherein said laser imaging system includes a plurality of laser targets fixed relative to said laser projector within a field of view of said laser projector and said computer controlling said laser projectors to periodically scan said laser targets to compensate for laser image drift.

24. The laser imaging system as defined in claim 23, wherein said laser projector is mounted on a frame and said laser targets are located on said frame within in a field of view of said laser projector.

25. The laser imaging system as defined in claim 24, wherein said second plurality of light receiving metrology receivers are mounted on said frame.

26. The laser imaging system as defined in claim 20, wherein said laser projector is mounted on a frame movable relative to said target surface and said second plurality of light receiving metrology receivers are located on said frame.

27. The laser imaging system as defined in claim 26, wherein said frame includes a proximal support surface receiving said laser projector, an open distal end through which said laser template is projected and said second plurality of light metrology receivers are mounted on said open distal end of said frame.

28. The laser imaging system as defined in claim 26, wherein said frame is integrally formed of a material having a low coefficient of expansion and contraction.

29. The laser imaging system as defined in claim 26, wherein said frame is mounted on a cart movable relative to said target surface.

30. The laser imaging system as defined in claim 20, wherein said plurality of light transmitting metrology transmitters are global positioning infrared light metrology transmitters and said first and second plurality of light receiving metrology receivers are global positioning infrared light metrology transmitters.

31. The laser imaging system as defined in claim 20, wherein said first plurality of light receiving metrology receivers include light receiving metrology receivers mounted on kinematic supports spaced from said target surface at predetermined locations each support having a lower mounting plate fixed to a floor at a predetermined fixed location, an upper mounting plate releasably attached to said lower mounting plate and a receiver mounted on said upper mounting plate permitting removal and replacement of said upper mounting plate and said receiver without modifying a location and orientation of said light receiving metrology receiver.

32. The laser imaging system as defined in claim 31, wherein said upper and lower mounting plates have interfitting element orienting said upper mounting plate relative to said lower mounting plate.

33. The laser imaging system as defined in claim 31, wherein said upper mounting plate is releasable attached to said lower mounting plate by a magnet.

34. The laser imaging system as defined in claim 20, wherein said light receiving metrology receivers include metrology receivers having a support including a cup-shaped receptacle configured to receive alternative receivers including one of said light receiving metrology receivers and a second reflective receiver of a coordinate measurement machine to independently determine a position and orientation of said light receiving metrology receiver.

35. A laser imaging system for projecting a laser template on a target surface at a defined location and orientation, said laser imaging system comprising:
  a plurality of metrology transmitters located at fixed locations;
  a first plurality of metrology receivers at fixed predetermined locations relative to said target surface each having a sensor associated therewith;
  a laser projector movable relative to said target surface;
  a second plurality of metrology receivers located at fixed locations each having a sensor associated therewith;
  a plurality of laser targets at fixed locations relative to said second plurality of metrology receivers within a field of view of said laser projector;
  a computer receiving data from said sensors of said first and second metrology receivers determining a location and orientation of said target surface and determining a position and orientation of laser projector relative to said second plurality of metrology receivers by scanning said laser targets with said laser projector; and
  a control for orienting a laser of said laser projector relative to said target surface and orienting said laser of said laser projector relative to said target surface to project a laser template on said target surface at said defined location and orientation.

36. The laser imaging system as defined in claim 35, wherein said laser projector is fixed relative to said laser targets and said second plurality of metrology receivers.

37. The laser imaging system as defined in claim 35, wherein said laser projector is mounted on a frame and said laser targets and said second plurality of metrology receivers are mounted on said frame in fixed relation.

38. The laser imaging system as defined in claim 37, wherein said frame includes an open distal end through which said laser template is projected and said laser targets are mounted on said open distal end of said frame within a field of view of said laser projector.

* * * * *